(12) United States Patent
Chen

(10) Patent No.: US 9,969,448 B1
(45) Date of Patent: May 15, 2018

(54) BICYCLE SEAT ADJUSTMENT DEVICE

(71) Applicant: Chao-Hu Chen, Taichung (TW)

(72) Inventor: Chao-Hu Chen, Taichung (TW)

(73) Assignee: KALLOY INDUSTRIAL CO., LTD., Taichung (TW)

( * ) Notice: Subject to any disclaimer, the term of this patent is extended or adjusted under 35 U.S.C. 154(b) by 0 days. days.

(21) Appl. No.: 15/650,977

(22) Filed: Jul. 17, 2017

(51) Int. Cl.
*B62J 1/10* (2006.01)
*B62K 19/36* (2006.01)
*B62J 1/08* (2006.01)
B62J 1/00 (2006.01)
B62K 19/00 (2006.01)

(52) U.S. Cl.
CPC . *B62J 1/10* (2013.01); *B62J 1/08* (2013.01); *B62K 19/36* (2013.01); *B62J 1/00* (2013.01); B62K 19/00 (2013.01)

(58) Field of Classification Search
CPC ..... Y10T 403/32516; Y10T 403/32467; Y10T 403/32501; F16B 7/1427; F16B 7/1463; B62K 21/24; B62K 19/36; B62J 1/00; B62J 1/06; B62J 1/08; A47C 3/20; A47C 3/285
See application file for complete search history.

(56) References Cited

U.S. PATENT DOCUMENTS

| 3,856,252 | A | * | 12/1974 | Regis | F16B 7/14 248/600 |
|---|---|---|---|---|---|
| 4,807,856 | A | * | 2/1989 | Teckenbrock | B62K 19/36 188/67 |
| 5,795,026 | A | * | 8/1998 | Dral | A47C 1/03 297/411.2 |
| 5,829,839 | A | * | 11/1998 | Wilkerson | A47C 1/03 297/411.36 |
| 6,132,001 | A | * | 10/2000 | Su | A47C 1/03 248/161 |
| 7,434,887 | B1 | * | 10/2008 | Hsien | A47C 1/03 297/411.36 |
| 2002/0140266 | A1 | * | 10/2002 | Broekhuis | A47C 3/265 297/353 |

* cited by examiner

Primary Examiner — Daniel J Wiley

(57) ABSTRACT

A bicycle seat adjustment device includes an inner tube which is inserted into a seat post. The bicycle seat is connected to the top end of the inner tube. The seat post is movably inserted into the upper portion of an outer tube, and the retractable portion of the inner tube is located in the lower portion of the outer tube. An operation unit is connected to the bottom end of the outer tube and controls the movement of the inner tube.

7 Claims, 6 Drawing Sheets

BICYCLE SEAT ADJUSTMENT DEVICE

BACKGROUND OF THE INVENTION

1. Fields of the Invention

The present invention relates to a bicycle seat adjustment device, and more particularly, to a bicycle seat adjustment device that is installed to a larger space at the lower end of the outer tube of the bicycle seat adjustment device.

2. Descriptions of Related Art

The conventional bicycle seat adjustment device known to applicant is located at the top of the seat tube, and the space for accommodating the suspension device is limited due to the diameter difference between the seat post and the seat tube. The small space very much limits the installation of the suspension device, and the installation time required is significantly long.

The present invention intends to provide a bicycle seat adjustment device, and the suspension device is installed in a larger space in the seat tube.

SUMMARY OF THE INVENTION

The present invention relates to a bicycle seat adjustment device and comprises an inner tube having a retractable portion and a push end respectively located on two ends thereof. A seat post includes a first path defined axially therethrough. A seat support is connected to the top end of the seat post so as to support a seat thereon. Multiple beads are rotatably embedded in the outside of the seat post. The push end is located in the first path. An outer tube has a second path defined axially therethrough. A portion of the seat post is inserted into the upper portion of the second path. The retractable portion is located in the lower portion of the second path. Multiple bead grooves are defined axially in the inner periphery of the second path. The beads on the seat post are received in the bead grooves to limit the seat post from spinning in the outer tube.

An operation unit is connected to the lower end of the outer tube and comprises a threaded member, a fixed member, a movable unit, a seat and a cable. A first passage is defined axially through the threaded member. The threaded member and the top end of the fixing member each have two locking holes. The seat and the bottom end of the fixing member each have another two locking holes. Two bolts extend through the two locking holes of the threaded member and are connected to the two locking holes in the top end of the fixing member. Another two locking bolts extend through the two locking holes of the seat and are connected to the two locking holes in the bottom end of the fixing member. The retractable portion extends through the first passage and contacts the top of the movable unit. The fixing member has a second passage. The movable unit comprises a first member, a second member and a gear. The first and second members and the gear are located in the second passage. Each of the first and second members has a horizontal portion and a vertical portion, wherein each vertical portion includes a toothed face which is engaged with the gear. The seat has a first cable hole and the horizontal portion of the first member includes a second cable hole. The cable includes a head on one end thereof. The cable extends through the first cable hole and the second cable hole, and the head of the cable is engaged with the opening of the second cable hole.

When the cable is pulled, the first member is moved, and the toothed face of the first member rotates the gear which moves the second member. The horizontal portion of the second member pushes the retractable portion to move the push end.

Preferably, the fixing member includes a radial hole defined radially therethrough. The gear includes a central hole. A pin extends through the radial hole and the central hole to engage the gear with the two respective toothed faces of the first and second members. The gear is not movable in the second passage.

Preferably, each of the locking holes of the fixing member includes inner threads. Each bolt includes a threaded section which is threadedly connected to the inner threads of the locking hole corresponding thereto.

Preferably, the fixing member is located between the seat and the threaded member.

Preferably, the retractable portion contacts the horizontal portion of the second member.

Preferably, the multiple bead grooves communicate with two ends of the outer tube.

Preferably, the inner tube is a pneumatic tube or a hydraulic tube.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
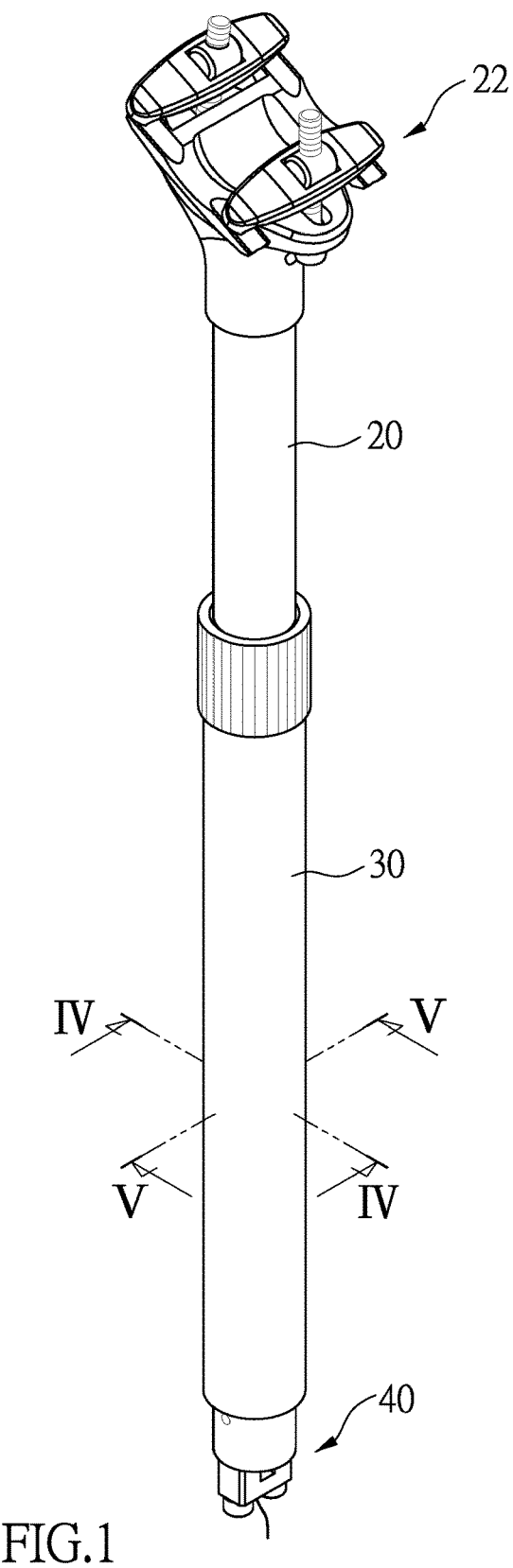
FIG. 1 is a perspective view to show the bicycle seat adjustment device of the present invention.
Figure 2:
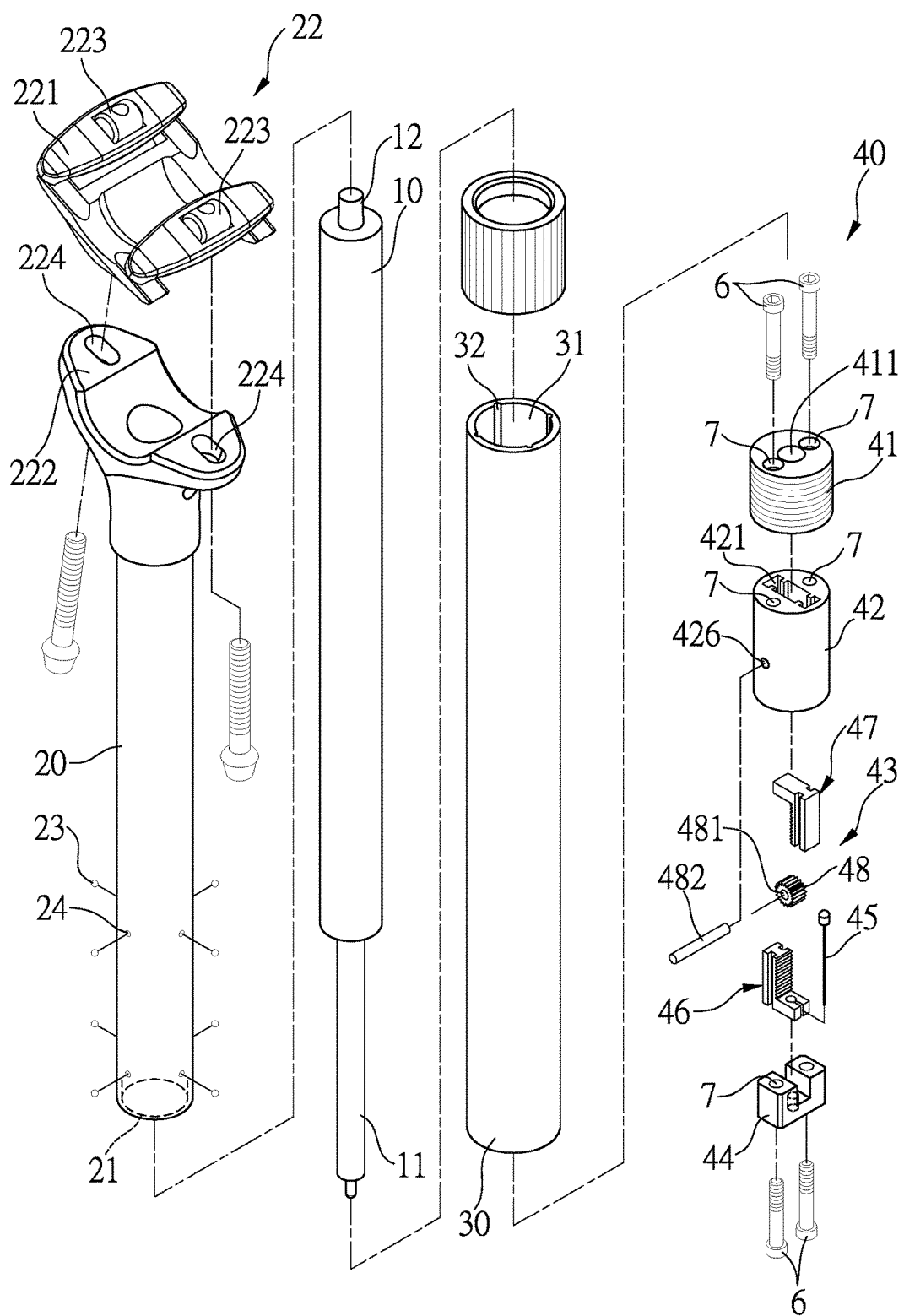
FIG. 2 is an exploded view of the bicycle seat adjustment device of the present invention.
Figure 3:
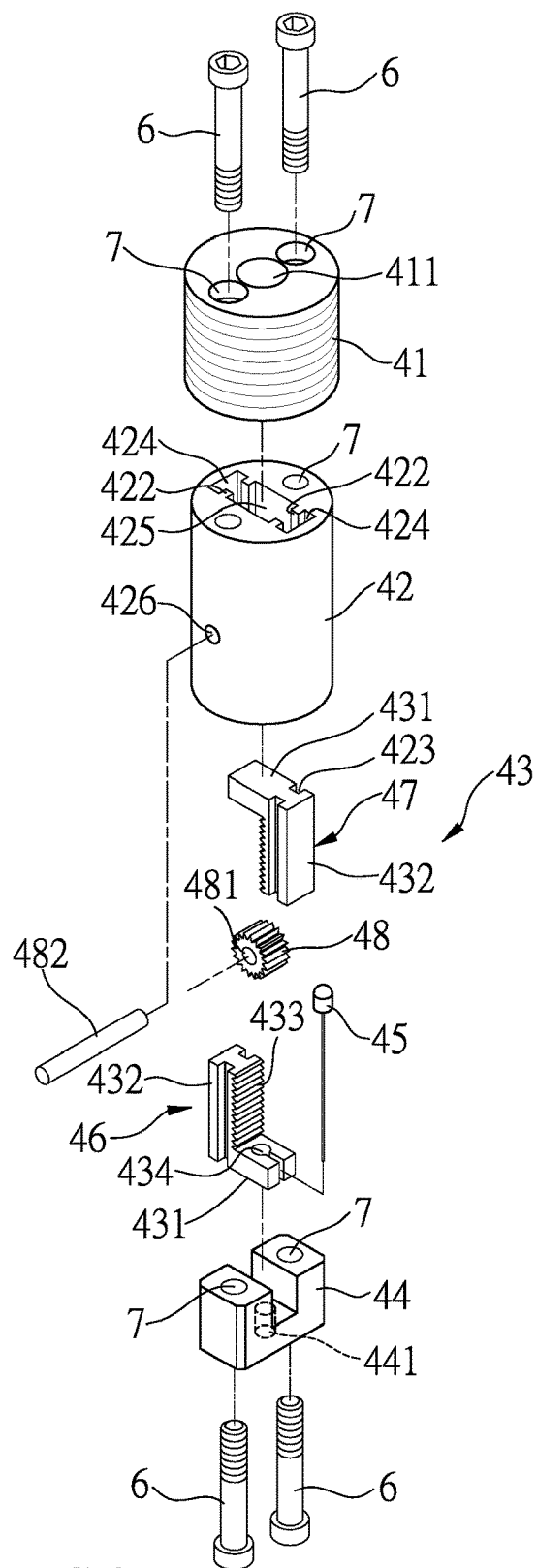
FIG. 3 is an exploded view of the operation unit of the bicycle seat adjustment device of the present invention.
Figure 4:
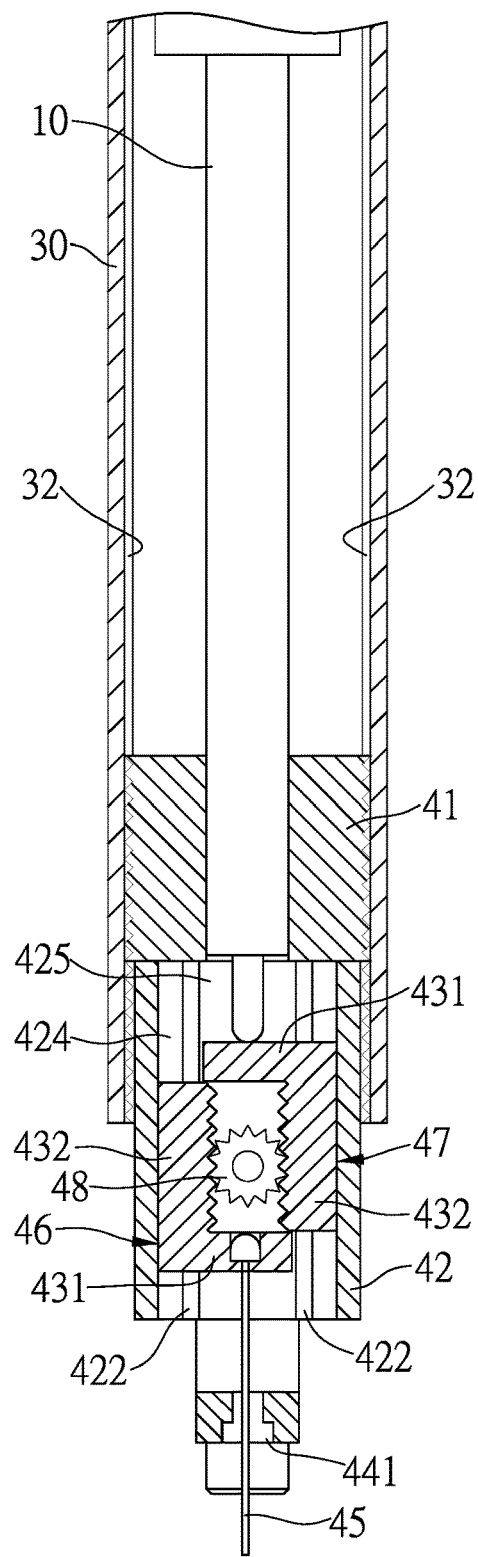
FIG. 4 is a cross sectional view, taken along line IV-IV in FIG. 1.
Figure 5:
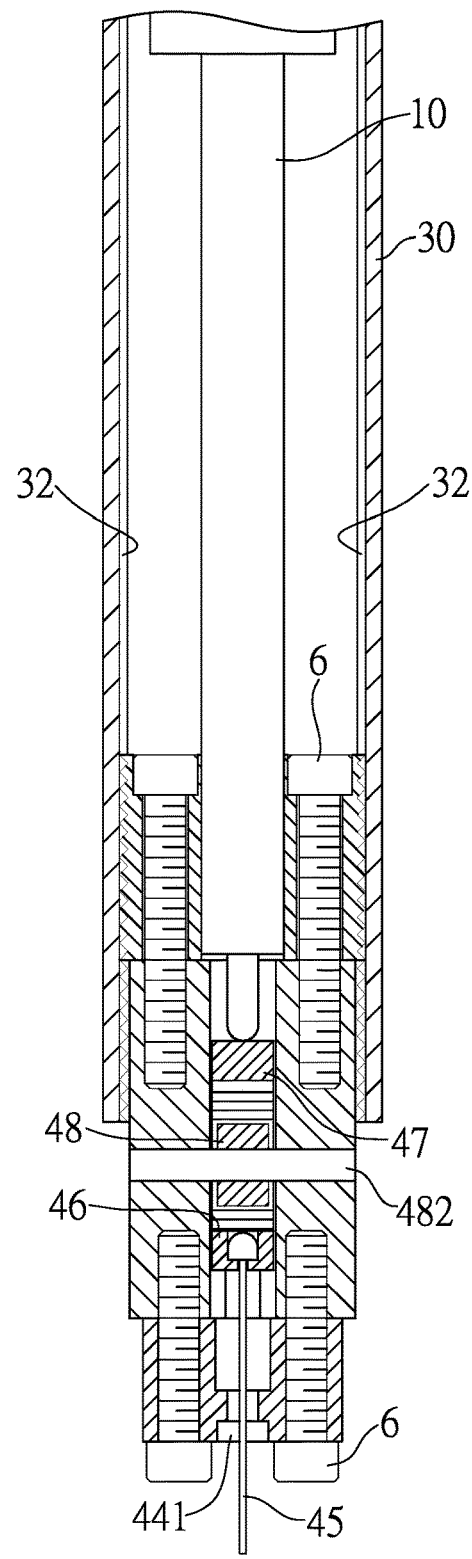
FIG. 5 is a cross sectional view, taken along line V-V in FIG. 1.

Referring to FIGS. 1 to 8, the bicycle seat adjustment device of the present invention comprises an inner tube 10 which is a pneumatic tube or a hydraulic tube, and has a retractable portion 11 and a push end 12 respectively located on two ends thereof.

A seat post 20 comprises a first path 21 defined axially therethrough, and a seat support 22 is connected to the top end of the seat post 20 so as to support a seat 8 thereon. The push end 12 is located in the first path 21. Multiple beads 23 are rotatably embedded in apertures 24 defined in the outside of the seat post 20. The seat support 22 includes a top part 221 and a bottom part 222 which is fixed to the top end of the seat post 20. The top part includes two universal connection members 223 on two ends thereof. The bottom part 222 includes two slots 224 defined through two ends thereof. Two bolts extend through the two slots 224 and the universal connection members 223 and are connected to the seat 8.

An outer tube 30 has a second path 31 defined axially therethrough, and a portion of the seat post 20 is inserted into the upper portion of the second path 31. The retractable portion 11 is located in the lower portion of the second path 31. Multiple bead grooves 32 are defined axially in the inner periphery of the second path 31 and communicate with two open ends of the outer tube 30. The beads 23 on the seat post 20 are received in the bead grooves 32 to limit the seat post 20 from spinning in the outer tube 30.

An operation unit 40 is connected to the lower end of the outer tube 30 and comprises a threaded member 41, a fixed member 42, a movable unit 43, a seat 44 and a cable 45. The fixing member 42 is located between the seat 44 and the threaded member 41. A first passage 411 is defined axially through the threaded member 41. The threaded member 41 and the top end of the fixing member 42 each have two locking holes 7. The seat 44 and the bottom end of the fixing member 42 each have another two locking holes 7. Two bolts 6 extend through the two locking holes 7 of the threaded member 41 and are connected to the two locking holes 7 in the top end of the fixing member 42. Another two locking bolts 6 extend through the two locking holes 7 of the seat 44 and are connected to the two locking holes 7 in the bottom end of the fixing member 42. It is noted that each of the locking holes 7 of the fixing member 42 includes inner threads, and each bolt 6 includes a threaded section which is threadedly connected to the inner threads of the locking hole 7 corresponding thereto. The retractable portion 11 extends through the first passage 411 and contacts the top of the movable unit 43. The fixing member 42 has a second passage 421 which is composed of a central hole 425 and two lateral holes 424 which communicate with the central hole 425, and the central hole 425 is located between the two lateral holes 424. Two pairs of flanges 422 respectively extend from two sides of the central hole 425 so as to perform as rails.

The movable unit 43 comprises a first member 46, a second member 47 and a gear 48. The first and second members 46, 47 and the gear 48 are located in the second passage 421. Specifically, the fixing member 42 includes a radial hole 426 defined radially therethrough, and the gear 48 includes a central hole 481. A pin 482 extends through the radial hole 426 and the central hole 481 to engage the gear 48 with the two respective toothed faces 433 of the first and second members 46, 47. The gear 48 is not movable in the second passage 421. Each of the first and second members 46, 47 has a horizontal portion 431 and a vertical portion 432, wherein each vertical portion 432 includes a toothed face 433 which is engaged with the gear 48. Each of the vertical portions 432 includes two reception groove 423 with which the flanges 422 are engaged. The seat 44 has a first cable hole 441, and the horizontal portion 431 of the first member 46 includes a second cable hole 434. The cable 45 includes a head on one end thereof. The cable 45 extends through the first cable hole 441 and the second cable hole 434, and the head of the cable 45 is engaged with the opening of the second cable hole 434. The retractable portion 11 contacts the horizontal portion 431 of the second member 47.

Figure 6:
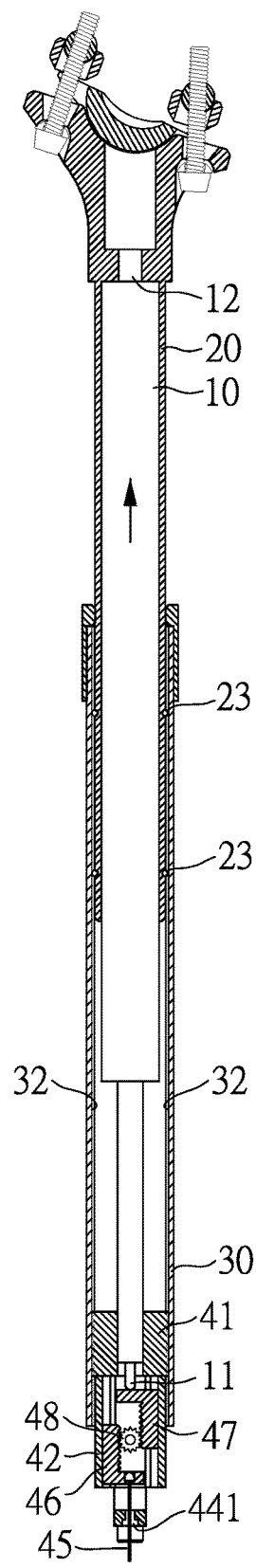
FIG. 6 is a cross sectional view to show the operational status of the bicycle seat adjustment device of the present invention.
Figure 8:
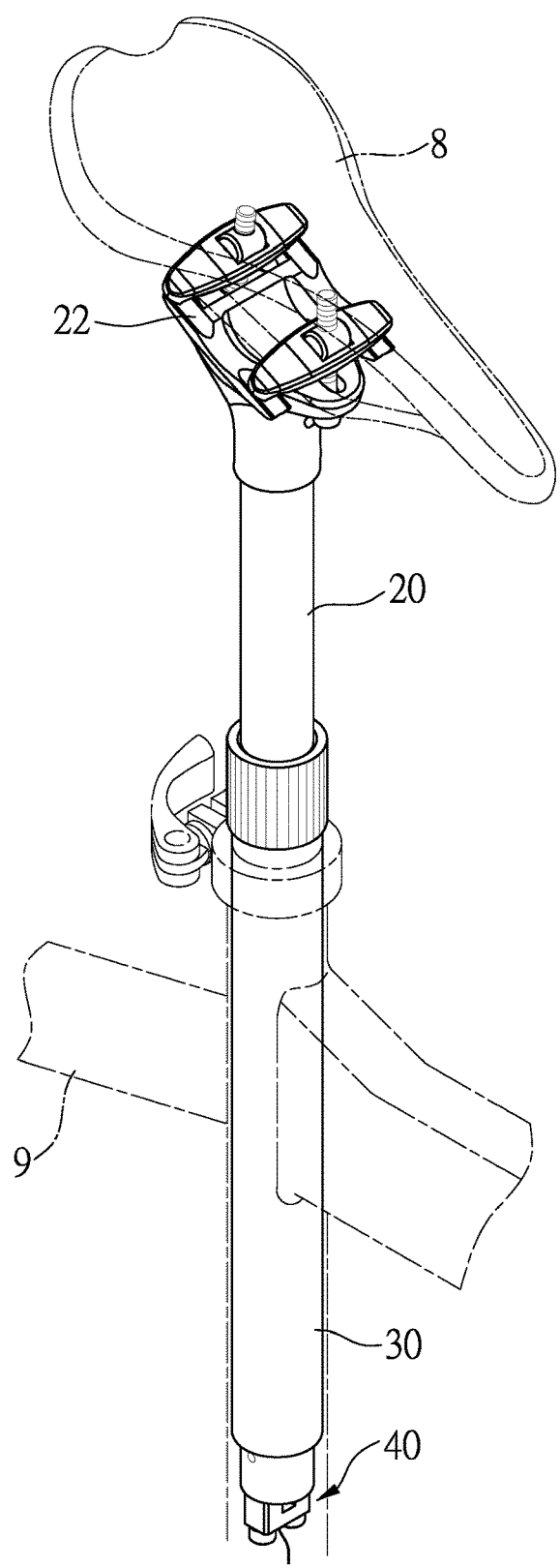
FIG. 8 shows that the bicycle seat adjustment device of the present invention is installed to a bicycle.

As shown in FIGS. 6 and 8, when the cable 45 is pulled, the first member 46 is moved downward and the toothed face 433 of the first member 46 rotates the gear 48 counter clockwise which moves the second member 47 upward. The horizontal portion 431 of the second member 47 pushes the retractable portion 11 to move the push end upward, so that the seat support 22 and the seat 8 move upward.

Figure 7:
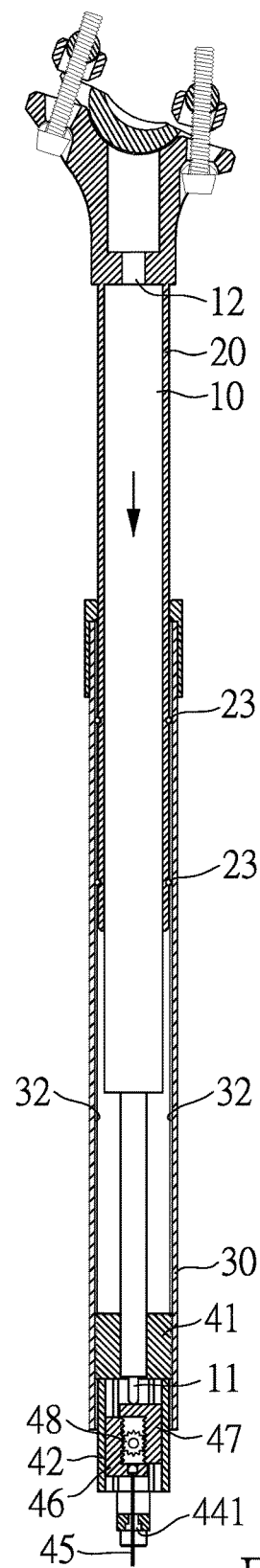
FIG. 7 is a cross sectional view to show another operational status of the bicycle seat adjustment device of the present invention.

As shown in FIGS. 7 and 8, when applying a downward force to the seat 8, and the downward force is larger than the force that the horizontal portion 431 of the second member 47 pushes the retractable portion 11 upward, so that the seat support 22 and the seat 8 move downward. The push end 12 brings the retractable portion 11 downward which pushes the second member 47 downward to rotate the gear 48, and the gear 48 rotates the toothed face 433 of the first part 46 downward.

While we have shown and described the embodiment in accordance with the present invention, it should be clear to those skilled in the art that further embodiments may be made without departing from the scope of the present invention.

What is claimed is:

1. A bicycle seat adjustment device comprising:
an inner tube (10) having a retractable portion (11) and a push end (12) respectively located on two ends thereof;
a seat post (20) having a first path (21) defined axially therethrough, a seat support connected to a top end of the seat post (20) so as to support a seat (8) thereon, multiple beads (23) rotatably embedded in an outside of the seat post (20), the push end (12) located in the first path (21);
an outer tube (30) having a second path (31) defined axially therethrough, a portion of the seat post (20) inserted into an upper portion of the second path (31), the retractable portion (11) located in a lower portion of the second path (31), multiple bead grooves (32) defined axially in an inner periphery of the second path (31), the beads (23) on the seat post (20) received in the bead grooves (32) to limit the seat post (20) from spinning in the outer tube (30), and
an operation unit (40) connected to a lower end of the outer tube (30) and comprising a threaded member (41), a fixing member (42), a movable unit (43), a seat (44) and a cable (45), a first passage (411) defined axially through the threaded member (41), the threaded member (41) and a top end of the fixing member (42) each having two locking holes (7), the seat (44) and a bottom end of the fixing member (42) each having another two locking holes (7), two bolts (6) extending through the two locking holes (7) of the threaded member (41) and connected to the two locking holes (7) in the top end of the fixing member (42), another two locking bolts (6) extending through the two locking holes (7) of the seat (44) and connected to the two locking holes (7) in the bottom end of the fixing member (42), the retractable portion (11) extending through the first passage (411) and contacting a top of the movable unit (43), the fixing member (42) having a second passage (421), the movable unit (43) comprising a first member (46), a second member (47) and a gear (48), the first and second members (46, 47) and the gear (48) located in the second passage (421), each of the first and second members (46, 47) has a horizontal portion (431) and a vertical portion (432), each vertical portion (432) includes a toothed face (433) which is engaged with the gear (48), the seat (44) has a first cable hole (441) and the horizontal portion (431) of the first member (46) includes a second cable hole (434), the cable (45) includes a head on one end thereof, the cable (45) extending through the first cable hole (441) and the second cable hole (434), and the head of the cable (45) is engaged with an opening of the second cable hole (434), when the cable (45) is pulled, the first member (46) is moved and the toothed face (433) of the first member (46) rotates the gear (48) which moves the second member (47), the horizontal portion (431) of the second member (47) pushes the retractable portion (11) to move the push end.

2. The bicycle seat adjustment device as claimed in claim 1, wherein the fixing member (42) includes a radial hole (426) defined radially therethrough, the gear (48) includes a central hole (481), a pin (482) extends through the radial hole (426) and the central hole (481) to engage the gear (48 with the two respective toothed faces (433) of the first and second members (46, 47), the gear (48) is not movable in the second passage (421).

3. The bicycle seat adjustment device as claimed in claim 1, wherein each of the locking holes (7) of the fixing member (42) includes inner threads, each bolt (6) includes a threaded section which is threadedly connected to the inner threads of the locking hole (7) corresponding thereto.

4. The bicycle seat adjustment device as claimed in claim 1, wherein the fixing member (42) is located between the seat (44) and the threaded member (41).

5. The bicycle seat adjustment device as claimed in claim 1, wherein the retractable portion (11) contacts the horizontal portion (431) of the second member (47).

6. The bicycle seat adjustment device as claimed in claim 1, wherein the multiple bead grooves (32) communicate with two open ends of the outer tube (30).

7. The bicycle seat adjustment device as claimed in claim 1, wherein the inner tube (10) is a pneumatic tube or a hydraulic tube.

* * * * *